United States Patent [19]

Rosenbrand et al.

[11] Patent Number: 4,914,184

[45] Date of Patent: Apr. 3, 1990

[54] POLYMERIZATION OF CO/OLEFIN WITH HALO MONOCARBOXYLIC ACID AND NON HYDROGEN HALIDE ACID

[75] Inventors: Gerrit G. Rosenbrand; James A. Salter, both of Amsterdam, Netherlands

[73] Assignee: Shell Oil Company, Houston, Tex.

[21] Appl. No.: 343,771

[22] Filed: Apr. 27, 1989

[30] Foreign Application Priority Data

Apr. 29, 1988 [NL] Netherlands .................... 8801123

[51] Int. Cl.$^4$ .............................................. C08G 67/02
[52] U.S. Cl. ...................................... 528/392; 526/62
[58] Field of Search ........................... 528/392; 526/62

[56] References Cited

U.S. PATENT DOCUMENTS 3,694,412 9/1972 Nozaki ........................... 260/63 CQ

FOREIGN PATENT DOCUMENTS 121965 10/1984 European Pat. Off. .
181014 5/1986 European Pat. Off. .
213671 3/1987 European Pat. Off. .
257663 3/1988 European Pat. Off. .

*Primary Examiner*—Harold D. Anderson
*Attorney, Agent, or Firm*—Dean F. Vance

[57] ABSTRACT

In the process of producing linear alternating polymer of carbon monoxide and at least one ethylenically unsaturated hydrocarbon in the presence of a catalyst composition formed from a palladium compound, a bidentate ligand of phosphorus and a non-hydrohalogenic acid having a pKa below 2, lessened reactor fouling is encountered when the amount of acid initially provided is limited with additional acid being provided when polymerization has reached a certain minimum level.

7 Claims, No Drawings

POLYMERIZATION OF CO/OLEFIN WITH HALO MONOCARBOXYLIC ACID AND NON HYDROGEN HALIDE ACID

FIELD OF THE INVENTION

This invention relates to a process for the production of linear alternating polymers of carbon monoxide and at least one ethylenically unsaturated hydrocarbon. More particularly, the invention relates to such a process wherein a reduced polymer fouling of the polymerization reactor is obtained.

BACKGROUND OF THE INVENTION

The class of polymers of carbon monoxide and olefin(s) has been known for a number of years. Brubaker, U.S. Pat. No. 2,495,286, produced such polymers of relatively low carbon monoxide content in the presence of free radical initiators, i.e., peroxy compounds. U.K. Pat. No. 1,081,304 produces such polymers of a higher carbon monoxide content in the presence of alkylphosphine complexes of palladium compounds as catalyst. Nozaki extended the process to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. The more recent general processes for the production of the polymers is illustrated by a number of published European Patent Application including 121,965, 181,014, 213,671 and 257,663. The process generally involves the use of a catalyst composition formed from a Group VIII metal selected from palladium, cobalt or nickel, the anion of a non-hydrohalogenic acid having a pKa below about 6, preferably below 2, and a bidentate ligand of phosphorous, arsenic or antimony. Although the scope of the polymerization is extensive, a frequently preferred catalyst composition is formed from a palladium salt, particularly palladium acetate, the anion of trifluoroacetic acid or p-toluenesulfonic acid and a bidentate ligand of phosphorous, particularly 1,3-bis(diphenylphosphino)-propane or 1,3-bis[di(2-methoxyphenyl)phosphino]propane. The resulting polymers, now considered conventional, are relatively high molecular weight materials having established utility as premium thermoplastics in the production of shaped articles produced by methods which are conventional for thermoplastics.

The process for the production of the linear alternating polymers typically comprises contacting the monomeric reactants, the catalyst composition and a reaction diluent in an autoclave or similar reactor under polymerization conditions of elevated temperature and pressure and obtaining the polymer product in the form of a suspension in the reaction diluent. The polymer is then recovered by conventional methods such as filtration or decantation. Although the process for the production of the linear alternating polymers results in he efficient production and recovery of polymer product in good yield, the process does result in some degree of reactor fouling as do most if not all polymerization processes. The polymer product that is deposited in the reactor, e.g., on reactor walls and baffle plates, represents an economic loss as well as necessitating the periodic removal of the deposited polymer by mechanical means.

It would be of advantage to provide an improved process for the production of linear alternating polymers of carbon monoxide and at least one ethylenically unsaturated hydrocarbon, which process is characterized by a reduced level of reactor fouling.

SUMMARY OF THE INVENTION

The present invention provides an improved process for the production of linear alternating polymers of carbon monoxide and at least one ethylenically unsaturated hydrocarbon in the presence of a catalyst composition formed from a palladium salt, the anion of a halogen-containing carboxylic acid and a bidentate ligand or phosphorus. More particularly, the present invention provides such a process wherein the extent of reactor fouling is lessened by control of the ratio of the quantity of palladium salt to the acid employed as the source of the anion component of the catalyst composition.

DESCRIPTION OF THE INVENTION

It has now been found that when the production of linear alternating polymers of carbon monoxide and at least one ethylenically unsaturated hydrocarbon is conducted in the presence of a catalyst composition formed from a palladium salt, a halogen-containing carboxylic acid having a pKa less than 2 and a bidentate ligand of phosphorus, reactor fouling is lessened by employing an initial catalyst composition component ratio of less than 6 equivalents of acid (as the source of the anion) per mole of palladium, calculated as the metal. When the concentration of the polymer-containing suspension reaches at least 0.2 g per 100 g of suspension, preferably at least 0.5 g per 100 g of suspension, additional strong non-hydrohalogenic acid is added to provide an acid concentration of at least 7 equivalents per mol of palladium.

The polymer produced according to the process of the invention are the linear alternating polymers of carbon monoxide and at least one ethylenically unsaturated hydrocarbon which are often referred to as polyketones or polyketone polymers. The ethylenically unsaturated hydrocarbons which are useful as precursors of the polyketone polymers have up to 20 carbon atoms inclusive, preferably up to 10 carbon atoms, and are aliphatic such as ethylene and other alpha-olefins including propylene, 1-butane, isobutylene, 1-octene and 1-dodecene, or are arylaliphatic having an aryl substituent on a carbon atom of an otherwise aliphatic molecule, particularly an aryl substituent on a carbon atom of the ethylene unsaturation. Examples of this latter class of ethylenically unsaturated hydrocarbons are styrene, p-methylstyrene, p-ethylstyrene and m-isopropylstyrene. Preferred polyketone polymers are copolymers of carbon monoxide, ethylene and a second hydrocarbon of at least 3 carbon atoms, particularly an alpha-olefin such as propylene.

When the preferred terpolymers of carbon monoxide, ethylene and a second hydrocarbon are produced, there will be at least two units incorporating a moiety of ethylene for each unit incorporating a moiety of the second hydrocarbon. Preferably there will be from about 10 units to about 100 units incorporating a moiety of ethylene per unit incorporating a moiety of the second hydrocarbon. The polymer chain of the preferred polymers is therefore illustrated by the repeating formula $$-[CO-(CH_2-CH_2)]_x-[CO-(G)]_y- \quad (I)$$

wherein G is the moiety of the second hydrocarbon polymerized through the ethylenic unsaturation. The —CO—(CH₂—CH₂)— units and the —CO—(G)— units are found randomly throughout the polymer chain and the ratio of y:x is no more than about 0.5. In the modification of the invention which produces copolymers of the carbon monoxide and ethylene without the presence of a second hydrocarbon, the polymers are illustrated by the above formula I wherein y is 0. When y is other than 0, i.e., terpolymers are produced, ratios of y:x from about 0.01 to about 0.1 are preferred. The end groups or "caps" of the polymer chain will depend upon what materials are present during the production of the polymer and how or whether the polymer has been purified. The precise nature of the end groups is of little significance so far as the overall properties of the polymer are concerned so that the polymers are fairly represented by the polymer chain depicted above.

Of particular interest are the polymers of the above formula having a molecular weight of from about 1000 to about 200,000, particularly those of molecular weight of from about 15,000 to about 150,000. The physical properties of the polymers will depend in part on the molecular weight, whether the polymer is a copolymer or a terpolymer and, in the case of terpolymers, the nature and the proportion of the second hydrocarbon present. Typical melting points of such polymers are from about 175° C. to about 280° C., particularly from about 210° C. to about 270° C. Such polymers have a limiting viscosity number (LVN), measured in m-cresol at 60° C., of from about 0.4 to about 10, preferably from about 1 to about 5.

The polymers are produced by the present process by contacting the carbon monoxide and hydrocarbon in the presence of a catalyst composition formed at least initially from a palladium salt, an anion of a halogen-containing monocarboxylic acid having a pKa below 2 and a bidentate ligand of phosphorous.

The palladium salt is preferably a palladium carboxylate and palladium salts such as palladium acetate, palladium propionate, palladium hexanoate and palladium octanoate are satisfactory. Particularly preferred is palladium acetate.

The bidentate phosphorus ligand is a diphosphine of the formula

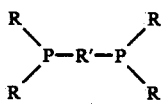

(II)

wherein R independently is aryl of up to 10 carbon atoms inclusive, and is hydrocarbyl containing only atoms of carbon and hydrogen or is substituted hydrocarbyl wherein any non-hydrocarbyl substituents are polar substituents such as alkoxy, dialkylamino or thioalkyl. Preferred R groups are phenyl or alkoxy-substituted phenyl, preferably methoxy-substituted phenyl, wherein at least one alkoxy substituent is in a ring position ortho to the ring carbon bound to the phosphorus. Particularly preferred R groups are phenyl or methoxphenyl. The R' group is a divalent bridging group of up to 10 carbon atoms in the phosphorus-phosphorous bridge. Preferred R' groups have from 2 to 3 carbon atoms in the bridge and are illustrated by 1,2-ethylene (dimethylene), 1,3-propylene (trimethylene) and 2,2-dimethyl-1,3-propylene. Particularly preferred as the R' group is 1,3-propylene.

Illustrative bidentate phosphorous ligands include 1,3-bis(diphenylphosphino)propane, 1,3-bis[di(2-methoxyphenyl)phosphino]-propane, 1,3-bis[di(2,4-dimethoxyphenyl)phosphino]propane and 1,3-bis[di(2,6-dimethoxyphenyl)phosphino]propane. Particularly preferred as the bidentate ligand of phosphorous is 1,3-bis[di(2-methoxyphenyl)phosphino]-propane. The bidentate phosphine ligand is employed in a quantity of from about 0.5 mol to about 2 mol per mol of palladium (as the metal) but preferably in a quantity of from about 0.75 mol to about 1.5 mol per mol of palladium.

The anion precursor of the catalyst composition is provided, at least initially, in the form of a halogen-containing monocarboxylic acid having a pKa below 2. The halogen of the halogen-containing monocarboxylic acid is suitable fluorine, chlorine or bromine, but preferably is lower halogen, i.e., fluorine or chlorine. Illustrative of such acids are trifluoroacetic acid, trichloroacetic acid, difluoroacetic acid and dichloroacetic acid. Trifluoroacetic acid is preferred. In the improved process of the invention whereby reactor fouling is retarded by staged acid addition, the amount of acid initially provided to the catalyst composition mixture is less than 6 equivalents of acid per mol of palladium. Preferably less than about 5 equivalents of acid per mol of palladium are initially provided and best results are obtained when from about 2 equivalents to about 4 equivalents of acid per mol of palladium are provided to the mixture from which the catalyst composition is formed.

Polymerization is conducted by adding the monomeric reactants, the catalyst composition precursors and a reaction diluent to a suitable reactor. The precise nature of the reactor is not critical although best results are obtained when reactant/catalyst composition contact can be maintained as by shaking or stirring. An autoclave equipped with stirring means is a preferred type of reactor. Suitable reaction diluents are inert towards the reactants and the catalyst composition and are liquid under the conditions of temperature and pressure under which the polymerization takes place. The class of lower alkanols is a useful class of reaction diluents and alkanols such as ethanol and methanol are satisfactory with methanol being preferred. The alkanol is used as a single reaction diluent or is provided as a mixture with other diluents including ketones such as acetone and methyl ethyl ketone and aromatic diluents such as toluene and ethylbenzene. Typical polymerization conditions include a temperature of from about 40° C. to about 120° C., preferably from about 50° C. to about 100° C. Suitable reaction pressures are from about 20 bar to about 150 bar but preferably are from about 30 bar to about 150 bar.

The amount of catalyst composition to be employed is sufficient to provide from about $1 \times 10^{-7}$ mol to about $1 \times 10^{-3}$ mol of palladium per mol of ethylenically unsaturated hydrocarbon to be polymerized. Provision of from about $1 \times 10^{-6}$ mol to about $1 \times 10^{-4}$ mol of palladium per mol of ethylenically unsaturated hydrocarbon. Molar ratios of ethylenically unsaturated hydrocarbon to carbon monoxide from about 10:1 to about 1:5 are satisfactory with molar ratios from about 5:1 to about 1:2 being preferred.

It is also useful, on occasion, to employ a hydroquinone as an additional catalyst composition component in order to enhance the activity of the catalyst. Suitable hydroquinones have up to 20 carbon atoms, inclusive, and are illustrated by benzoquinones, naphthoquinones and anthraquinones. In general, 1,4-benzoquinones are preferred when hydroquinone is added and particularly useful is 1,4-benzoquinone. The use of a hydroquinone is not required, of course, but if present, quantities of hydroquinone up to about 1000 mol per mol of palladium are satisfactory. When present, amounts of hydroquinone from about 25 mols to about 250 mols per mol of palladium are preferred.

In the improved process of the invention, polymerization takes place in the presence of the initially provided catalyst composition until a certain desired extent of polymerization has taken place. The polymer product is generally insoluble in the reaction diluent and the course and extent of polymerization can be followed by determining the polymer concentration in the polymer-containing suspension in the reaction diluent. To obtain best results in the process of the invention, additional strong acid is added when the polymer concentration has reached a level of at least 0.2 g per 100 g of the polymer-containing suspension. The strong acid added when the polymerization has reached at least the desired level is a non-hydrohalogenic acid having a pKa less than 2. In what is a preferred modification, the strong acid added during polymerization is the same acid initially provided as a source of the anion component of the catalyst composition, i.e., a halogen-containing monocarboxylic acid and preferably trifluoroacetic acid. In an alternate modification, however, a second non-hydrohalogenic acid having a pKa below 2 is employed. Examples of such acids are inorganic acids such as sulfuric acid or perchloric acid and organic sulfonic acids such as p-toluenesulfonic acid and 2-hydroxy-propane-2-sulfonic acid. The amount of the additional acid to be utilized is from about 1 equivalent per mole of palladium to about 25 equivalents of acid per mol of palladium. When the additional acid is a halogen-containing monocarboxylic acid such as the acid initially provided, the amount of supplemental halogen-containing monocarboxylic acid should preferably be from about 4 to about 20 equivalents of such acid per mol of palladium. If the supplemental acid is other than a halogen-containing monocarboxylic acid, the preferred amount of supplemental acid to be added is from about 1 equivalent to about 3 equivalents per mol of palladium.

Subsequent to the addition of the supplemental acid, polymerization is allowed to continue until complete or the viscosity of the polymer-containing suspension becomes such that continued heat removal is difficult. Polymerization is then terminated as by cooling the reactor and contents and releasing the pressure. The polymer product is then recovered by conventional procedures such as filtration or decantation. The polymer is used as obtained or is purified as by treatment with a solvent which is selective for catalyst residues. The linear alternating polymers of carbon monoxide and at least one olefinically unsaturated hydrocarbon have recognized utility in the production of films, sheets, wires and cables and shaped articles such as containers for food and drink. Such objects are produced by methods conventionally employed for thermoplastics including extrusion, injection molding and thermoforming.

The process of the invention is characterized by a lessened degree of fouling of the reactor in which the polymer is produced. This results in economic advantages in terms of polymer recovered but of equal or possibly greater significance is the less frequent need for reactor cleaning which typically is done manually or with mechanical means.

The invention is further illustration by the following Conparative Examples (not of the invention) and the following Illustrative Embodiments which should not be construed as limiting the invention. In each case, the terpolymer product was found by means of $^{13}$C-MMR analysis to be of a linear alternating structure consisting of the units $-CO\{C_2H_4\}-$ and $-CO\{C_3H_6\}-$ occurring randomly within the terpolymer chain.

COMPARATIVE EXAMPLE 1

A terpolymer of carbon monoxide, ethylene and propylene was prepared by charging to a stirred autoclave of 100 liter capacity 45 kg of methanol and 3.5 kg of propylene. After the autoclave and contents had been heated to 75° C., an equimolar mixture of carbon monoxide and ethylene was introduced until a pressure of 45 bar was reached. A catalyst composition solution was then added which comprised 100 ml of methanol, 100 ml of toluene, 0.75 mmol of palladium acetate, 15 mmol of trifluoroacetic acid and 0.90 mmol of 1,3-bis[di(2-methoxyphenyl)phosphino]propane. During polymerization the pressure was maintained at 45 bar by continued introduction of an equimolar mixture of carbon monoxide and ethylene. After 47 hours, the polymerization was terminated by cooling the reactor and releasing the pressure. The polymer suspension was removed and the autoclave was flushed with 45 liters of methanol. The methanol suspensions were filtered and the recovered polymer was washed with methanol and dried at 50° C. The yield was 5.2 kg of a terpolymer having a LVN of 1.88 dl/g, as measured in m-cresol at 60° C., a bulk density of 290 kg/m$^3$ and a melting point of 228° C.

Inspection of the inside of the autoclave revealed that a considerable amount of polymer had been deposited on the walls and baffle plates of the autoclave and on the stirrer. This terpolymer was removed by mechanical means, washed with methanol and dried at 50° C. The quantity of terpolymer thus recovered was 1.5 kg. The amount of reactor fouling was calculated to be 22%.

COMPARATIVE EXAMPLE

A terpolymer of carbon monoxide, ethylene and propylene was prepared by a procedure substantially similar to that of Comparative Example I except that the catalyst composition solution contained 0.375 mmol of palladium acetate instead of 0.75 mmol, 7.5 mmol of the trifluoroacetic acid instead of 15 mmol, 0.45 mmol of the diphosphinopropane instead of 0.90 mmol and the reaction time was 44 hours instead of 47 hours. The yield of terpolymer in the polymer suspension plus washings was 4.5 kg and the terpolymer had an LVN of 2.28 dl/g when measured in m-cresol at 60° C., a bulk density of 65 kg/m$^3$ and a melting point of 230° C. The terpolymer recovered by mechanical means was 0.7 kg and the reactor fouling was thus calculated to be 13.5%.

COMPARATIVE EXAMPLE III

A carbon monoxide/ethylene/propylene terpolymer was produced by a procedure substantially similar to that of Comparative Example I except that
(a) the initial catalyst composition solution included 3 mmol of trifluoroacetic acid instead of 15 mmol, (b) when the polymer concentration in the autoclave had reached 0.7 g per 100 g of polymer-containing suspension a solution of 12 mmol of trifluoroacetic acid in 50 ml of methanol was added, and (c) the reaction time was 26 hours instead of 47 hours.

The yield of polymer in the polymer suspension plus washings was 2.4 kg. The terpolymer product had an LVN of 2,22 dl/g when measured in m-cresol at 60° C. and a melting point of 226° C. The polymer recovered by mechanical means was 100 g and the reactor fouling was thus calculated to be 4%.

ILLUSTRATIVE EMBODIMENT I

A terpolymer of carbon monoxide, ethylene and propylene was produced by a procedure substantially similar to that of Comparative Example II except that (a) the initial catalyst composition solution contained 0.75 mmol of trifluoroacetic acid instead of 7.5 mmol, (b) when the polymer concentration in the autoclave had reached 0.8 g of polymer per 100 g of the polymer-containing suspension a solution of 6.75 mmol of trigluoroacetic acid in 50 ml of methanol was added to the autoclave, and (c) the reaction time was 47 hours instead of 44.

The yield of terpolymer from the polymer-containing suspension plus washings was 5.5 kg. The terpolymer recovered by mechanical means was 50 g. The reactor fouling was therefore calculated to be 0.9%.

ILLUSTRATIVE EMBODIMENT II

A terpolymer of carbon monoxide, ethylene and propylene was produced by a procedure substantially similar to that of Comparative Example I, except that (a) the initial catalyst composition solution comprised 100 ml of methanol, 100 ml of toluene, 0.188 mmol of palladium acetate, 0.375 mmol of trifluoroacetic acid and 0.225 mmol of 1,3-bis[di(2-methoxyphenyl)phosphino]propane, (b) when the polymer concentration in the autoclave had reached 0.6 g per 100 g of polymer-containing suspension a catalyst composition solution comprising 100 ml of methanol, 100 ml of toluene, 0.562 mmol of palladium acetate, 14.625 mmol of trifluoroacetic acid and 0.675 mmol of 1,3-bis[di(2-methoxyphenyl)phosphino]propane was added to the autoclave, and (c) the reaction time was 22 hours instead of 47 hours.

The yield of polymer from the polymer suspension plus washings was 3.5 kg. The terpolymer had an LVN of 2.03 dl/g, when measured in m-cresol at 60° C., and a melting point of 222° C. The polymer recovered by mechanical means was 80 g and the reactor fouling was thus calculated to be 2.2%.

What is claimed is:

1. In the process of producing linear alternating polymer of carbon monoxide and at least one ethylenically unsaturated hydrocarbon by contacting the carbon monoxide and hydrocarbon under polymerization conditions in the presence of a catalyst composition formed from a mixture of a palladium salt, a non-hydrohalogenic acid having a pKa less than 2 and a bidentate ligand of phosphorus, the improvement wherein the acid provided to the initial catalyst composition mixture is a halogen-containing monocarboxylic acid provided in a quantity less than 6 equivalents of acid per mol of palladium and, when the concentration of the polymer thereby produced has reached at least 0.2 g of polymer per 100 g of polymer-containing suspension, an amount of non-hydrohalogenic acid, having a pKa less than 2, from about 1 equivalent to about 25 equivalents per mol of palladium is added.

2. The process of claim 1 wherein the halogen-containing monocarboxylic acid is trifluoroacetic acid.

3. The process of claim 2 wherein the non-hydrohalogenic acid is trifluoroacetic acid.

4. The process of claim 3 wherein the trifluoroacetic acid provided to the initial catalyst composition mixture is provided in a quantity of from about 2 equivalents to about 4 equivalents per mol of palladium.

5. In the process of producing a linear alternating terpolymer of carbon monoxide, ethylene and propylene by contacting the carbon monoxide, ethylene and propylene under polymerization conditions in the presence of a catalyst composition formed from a mixture of palladium acetate, trifluoroacetic acid and a bidentate ligand of phosphorus, the improvement which comprises providing the trifluoroacetic acid to the initial catalyst composition mixture in a quantity less than about 5 equivalents of acid per mol of palladium and, when the concentration of the terpolymer thereby produced has reached at least 0.5 g per 100 g of polymer-containing suspension, adding additional trifluoroacetic acid in an amount from about 1 equivalent to about 25 equivalent per mol of palladium.

6. The process of claim 5 wherein the acid of the initial catalyst composition mixture is provided in a quantity of from about 2 equivalents to about 4 equivalents per mol of palladium.

7. The process of claim 6 wherein the additional acid is added in an amount from about 4 equivalents to about 20 equivalents per mol of palladium.

* * * * *